United States Patent
Wynnobel et al.

(10) Patent No.: US 8,069,973 B2
(45) Date of Patent: Dec. 6, 2011

(54) FLIGHTING FOR A CONVEYOR AND APPARATUS FOR PRODUCING SUCH FLIGHTING

(75) Inventors: Robert Wynnobel, Selkirk (CA); Andrew Wilton, Orion, IL (US)

(73) Assignee: Uniflyte Inc., Orion, IL (US)

( * ) Notice: Subject to any disclaimer, the term of this patent is extended or adjusted under 35 U.S.C. 154(b) by 53 days.

(21) Appl. No.: 12/773,221

(22) Filed: May 4, 2010

(65) Prior Publication Data

US 2011/0272252 A1    Nov. 10, 2011

(51) Int. Cl.
*B65G 33/32*    (2006.01)
(52) U.S. Cl. ........................................ 198/666; 198/667
(58) Field of Classification Search ................ 198/676, 198/677, 657, 670
See application file for complete search history.

(56) References Cited

U.S. PATENT DOCUMENTS

| 1,113,688 | A |   | 10/1914 | Porter |         |
|-----------|---|---|---------|--------|---------|
| 1,684,254 | A |   | 9/1928  | Bailey |         |
| 1,775,888 | A | * | 9/1930  | Christian | 198/666 |
| 3,276,571 | A | * | 10/1966 | Vohl   | 198/676 |
| 4,842,126 | A | * | 6/1989  | McConnell | 198/666 |
| 5,678,440 | A |   | 10/1997 | Hamilton |       |
| 7,516,838 | B2 | * | 4/2009 | Dutschke | 198/677 |

FOREIGN PATENT DOCUMENTS

| FR | 7506230 | 2/1975 |
| GB | 472254  | 9/1937 |
| RU | 772664  | 10/1980 |

* cited by examiner

*Primary Examiner* — James R Bidwell
(74) *Attorney, Agent, or Firm* — Nikolai & Mersereau, P.A.; Thomas J. Nikolai

(57) ABSTRACT

Flighting for screw conveyors of improved construction and resulting in better wear characteristics and carrying capacity is provided through the use of cold roll manufacturing and a roller which forms the flighting with a shape which moves some of the material being conveyed away from the outside peripheral edge of the flighting and thereby distributes wear over a larger portion of the surface of the flighting.

10 Claims, 4 Drawing Sheets

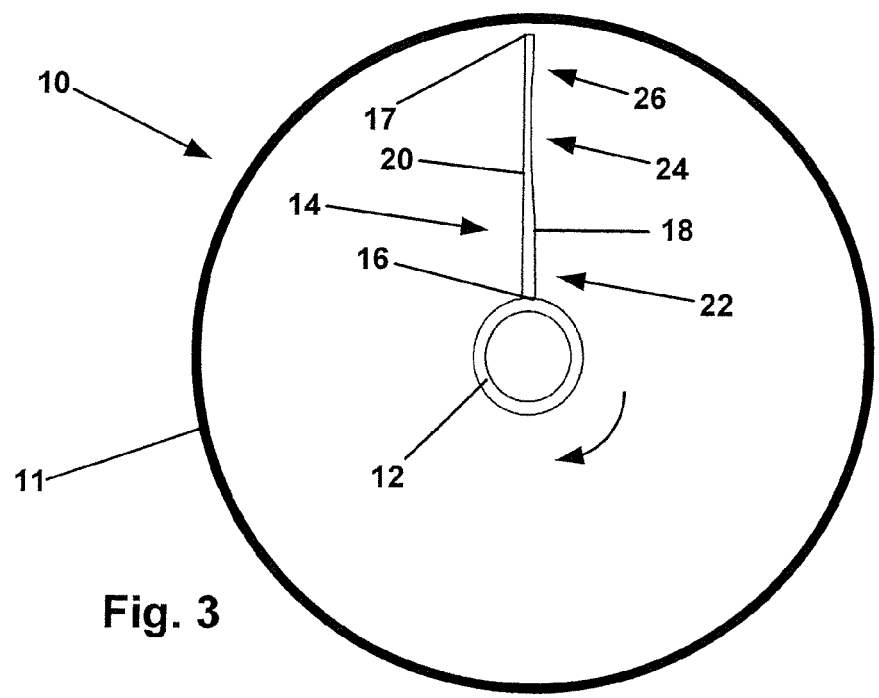
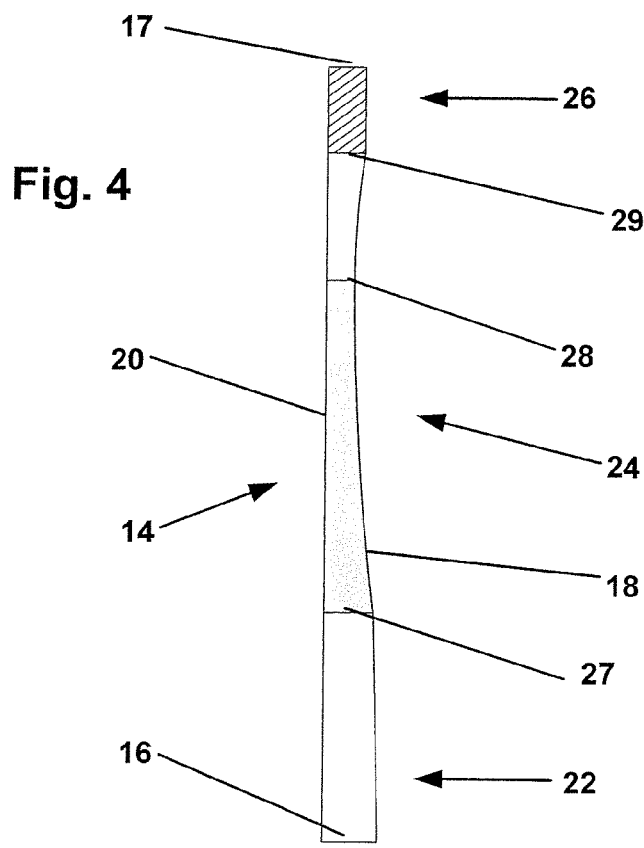
Fig. 3
Fig. 4

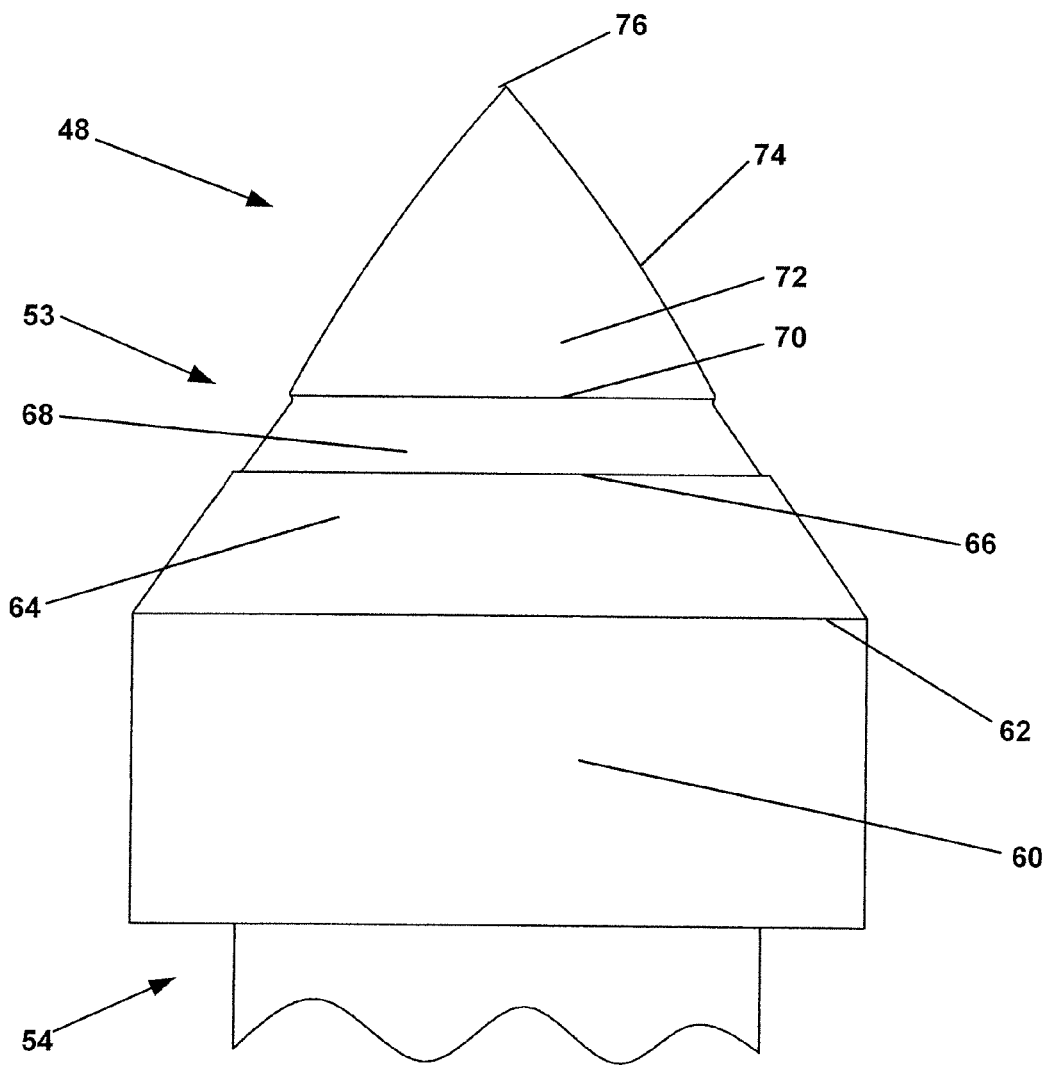

FLIGHTING FOR A CONVEYOR AND APPARATUS FOR PRODUCING SUCH FLIGHTING

CROSS-REFERENCED TO RELATED APPLICATIONS

Not applicable.

STATEMENT REGARDING FEDERALLY SPONSORED RESEARCH OR DEVELOPMENT

Not applicable.

BACKGROUND OF THE INVENTION

I. Field of the Invention

The present invention relates to conveyors such as augers and other screw conveyors. More specifically, this invention relates to an improved design for the flighting of such conveyors and the equipment and methods used to make such flighting.

Screw conveyors are one of several inventions and discoveries traditionally attributed to Archimedes in the Third Century B.C. Such conveyors comprise a screw inside a hollow pipe or tube. The screw has a shaft and flighting surrounding the shaft. As the screw turns inside the tube, material is carried by the flighting from one end of the tube to the other. Such material can be a liquid such as water or other aggregate materials such as grain.

Efforts have been made since the earliest invention of the screw conveyor to improve on the basic invention. Some of these efforts relate to trying to improve the capacity of the screw conveyor by, for example, changing the diameter of the tube and changing the number and angle of the flights. Other efforts have been made to improve the life span of the conveyor which is susceptible to substantial wear especially at the outside peripheral edge of the flighting. In the more than 2300 years since the screw conveyor was first invented, no one has been able to satisfactorily modify the basic design to improve the capacity of the conveyor and reduce wear at the outside peripheral edge of the flighting.

Historically, the shaft and flighting of a screw conveyor have been integrally formed. More commonly, however, the flighting and shaft are separately formed and then joined together by a weldment. A cold rolling process is typically used to form the flighting.

The cold rolling process traditionally used has resulted in a helical flighting having an inner edge nearest the shaft which is thicker than the outside peripheral edge nearest the tube surrounding the screw. The outside peripheral edge has traditionally been the portion most subject to wear because of frictional forces between the tube, the material being conveyed and the flighting.

Various attempts have been made to improve the wear characteristics of flighting by increasing the thickness of the outside peripheral edge. For example, U.S. Pat. No. 1,113,688 to G. M. Porter dated Oct. 13, 1914 discloses several embodiments in which auxiliary helical members are secured to the flighting to augment the thickness of the outside peripheral edge of the flighting for improved wear characteristics. U.S. Pat. No. 1,684,254 to J. O. Bailey dated Apr. 26, 1927 discloses several embodiments including a peripheral bead or thickened portion 7 on the outside peripheral edge of the flighting. Adding auxiliary helical members as disclosed in the Porter patent or beading as disclosed in the Bailey patent increases the time, expense and number of steps required to complete construction of the flighting. Also, these additional efforts have been of marginal utility because, for example, the abrupt edges, points, and transitions of the beading shown in Bailey and the auxiliary members and thin areas near the auger shaft of Porter are subject to wear and the result is still not long lasting flighting.

U.S. Pat. No. 5,678,440 to Hamilton represents an effort to provide beading similar to that disclosed in Bailey without requiring additional steps, time, or money. However, the flighting disclosed in the Hamilton patent, shown herein in FIG. 2, is subject to unacceptable wear. Such wear is particularly acute in the area of the sharp radius on the carrying side of the flighting where the flighting transitions from a thinner area to the thicker area adjacent the outside edge of the flighting.

II. Related Art

SUMMARY OF THE INVENTION

To improve the wear characteristics and material flow rate, continuous helical flighting for a screw conveyor is provided having three discrete sections—an inside section, a central concave section and an outside section. The inside section has a length of about 30% of the length of the radius of the flighting. The central concave section has a length of about 60% of the length of the radius of the flighting. The outside section has a length of about 10% the length of the radius of the flighting. The inside section is the thickest section and tapers slightly as it extends from the inner edge of the flighting to the transition between the inside section and the central concave section. The outside section is about 75% as thick as the thinnest portion of the inside section. The thinnest area of the central concave portion is about 55% to 60% as thick as the thinnest area of the inside section. To create smoother transitions between the central section and the inside and outside sections, the thinnest area of the central section is not at its midpoint along its length, but instead is between 66% and 75% of the distance from the transition between the inside section and the central section to the transition between the central section and the outside section. Providing a tapered inside section and positioning the thinnest point of the central concave section nearer the outside section results in smooth transitions between adjacent sections of the flighting. As such, the carrying surface is free of ridges, other abrupt transitions and other sharply radiused areas. Ridges, abrupt transitions and sharply radiused areas on the carrying surface of flighting tend to increase friction between the carrying surface and the material being conveyed. Providing these novel and unique surface characteristics not only improves the wear characteristics of the flighting, but also the carrying capacity of the conveyor.

U.S. Pat. No. 5,678,440 to Hamilton, in FIGS. 4 and 5, shows a cold rolling apparatus for cold rolling metal into a flighting having the shape represented in FIG. 2 of the Hamilton patent. By modifying the shape of roller 58 and moving the pinch point between the two rollers 56 and 58, the improved flighting of the present invention can be made in a single step cold roll process. Improvements have also been made to the construction of the rollers for increased durability. Also, hydraulic motors attached to a pump and valve arrangement have been provided to replace the motor 88, speed change selector boxes 72, 74 and transmission, clutch and belts to reduce noise generated by the cold roll machine, the cost of the cold roll machine, maintenance thereof, and the time required to change the rollers 56 and 58 when necessary or desired.

BRIEF DESCRIPTION OF THE DRAWINGS

FIG. 3 shows a transverse section of a conveyor incorporating the shaft and flighting of FIG. 1.

FIG. 4 is a cross-section of the flighting of the conveyor shown in FIG. 1.

FIG. 7 shows a side elevation of the roller which forms the carrying surface of the flighting shown in FIG. 1.

DETAILED DESCRIPTION

Figure 1:
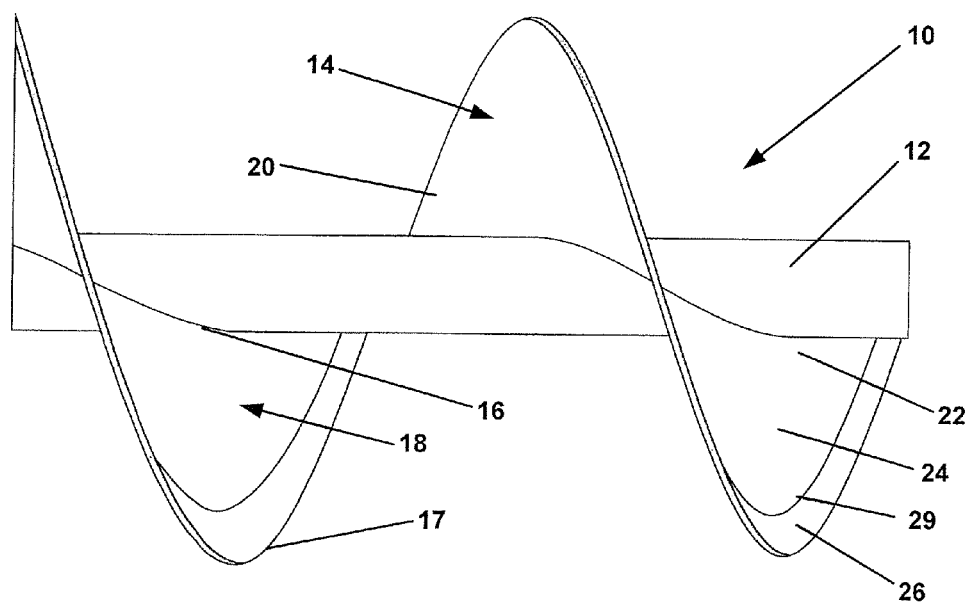
FIG. 1 shows a side elevation of a section of the shaft and flighting of a conveyor made in accordance with the present invention.

The conveyor 10 of the present invention includes a cylindrical outer casing 11 in the form of a hollow pipe or tube, a shaft 12 and a continuous flighting 14 extending the length of the shaft as shown in FIGS. 1, 3 and 4. The inner edge 16 of the flighting 14 is permanently coupled to the shaft 12 in any standard manner such as by welding so the shaft 12 and flighting 14 rotate together within the casing 11. The flighting is, of course, helical in shape and projects in a radial fashion from the shaft 12 to an outside peripheral edge 17. The flighting is formed with a carrying surface 18 and a rear surface 20. Material to be conveyed contacts the carrying surface 18 and rides along carrying surface 18 as the shaft 12 and flight 14 of conveyor 10 rotate to move the material from one end of the conveyor 10 toward the other.

Figure 2:
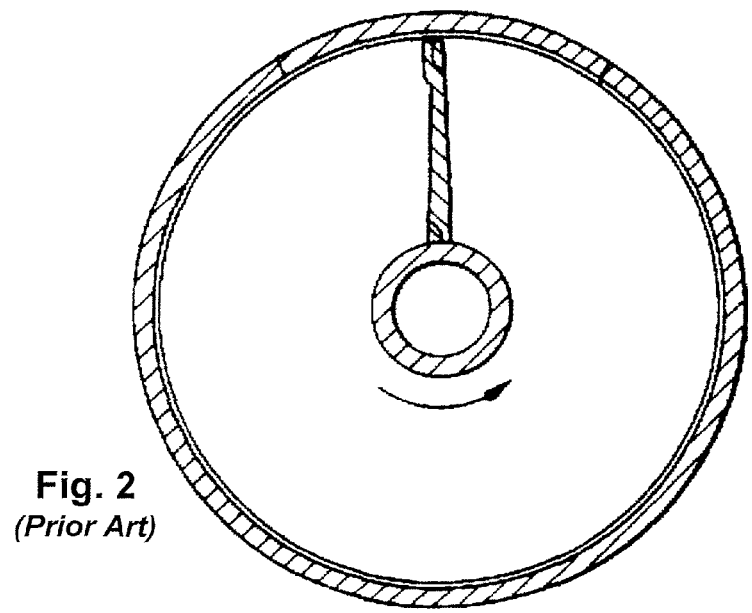
FIG. 2 shows a transverse section of a prior art screw conveyor over which the conveyor of the present invention offers a substantial advantage.

FIG. 2 shows a prior art screw conveyor having flighting comprising two sections, an inner tapered section extending from the inner edge joined to the shaft and an outer section adjacent the outside edge. The transition on the carrying surface of the flighting between these two sections is quite abrupt. As such, an area of increased friction and wear is present. As illustrated in FIGS. 3 and 4, the carrying surface 18 of the subject invention has three distinct sections—an inside section 22 adjacent the inner edge 16 and the shaft 12, an outside section 26 adjacent the outside peripheral edge 17, and a central concave section 24. A smooth transition 27 is present between the inside section 22 and the adjacent central concave section 24. Likewise, a smooth transition 29 is present between the central concave section 24 and the adjacent outside section 26.

As the inside section 22 extends radially from the inner edge 16 toward the transition 27, the carrying surface 18 tapers toward the rear surface 20. As such, the thickness of the inside section 22 at transition 27 is only about 89% of the thickness of the inside section 22 at the inner edge 16. This tapering makes the transition 27 between the inside section 22 and the central concave section 24 less abrupt. The transition 27 is also less abrupt because the thinnest point 28 of the central concave section 24 is not at the midpoint between the transitions 27 and 29. Instead, the thinnest point 28 is at about two-thirds the length of the central concave section 24 from transition 27 and thus at about one-third the length of the central concave section 24 from transition 29. The thinnest point 28 is between about 40% and 80% (and preferably about 50%) as thick as the inside section 22 in the area at or immediately adjacent to inner edge 16.

The outside section 26 extends between about 10% and 12% of the overall radial length of the flighting 14. While not as thick as the inside section 22, the outside section 26 is about 130% thicker than the thinnest point 28 of the central concave section 24. The transition 29 between the central concave section 24 and outside section is smooth rather than abrupt because the thickness of the material increases gradually from the thickness at the thinnest point 28 to the thickness of the outside section 26. The smooth nature of transitions 27 and 29 between adjacent sections results in a carrying surface 18 which is free of abrupt changes which can cause increased friction and wear.

In summary, the radial length of the inside section 22 is between about 25% and 30% of the overall radial length of the flighting 14. The radial length of the central concave section 24 is between about 55% and 60% of the overall radial length of the flighting 14. The outside section 26 is thus between 10% and 15% of the overall radial length of the flighting 14 and preferably between 10% and 12% of the overall radial length of flighting 14. In terms of thickness, the thickness at transition 27 is between about 85% and 92% of the thickness at the inner edge 16. The outside section 26 is between about 65% and 70% as thick as the thickness at the inner edge 16. The thinnest point 28 of the central concave section 24 is about 50% and 55% of the thickness at the inner edge 16. These dimensions and percentages relate to the flighting 14 as formed and do not take into account any changes in thickness occurring at or near the inner edge 16 resulting from attaching the flighting 14 to the shaft 12. This arrangement, particularly because of the smooth transitions 27 and 29, results in substantially improved wear characteristics.

Figure 5:
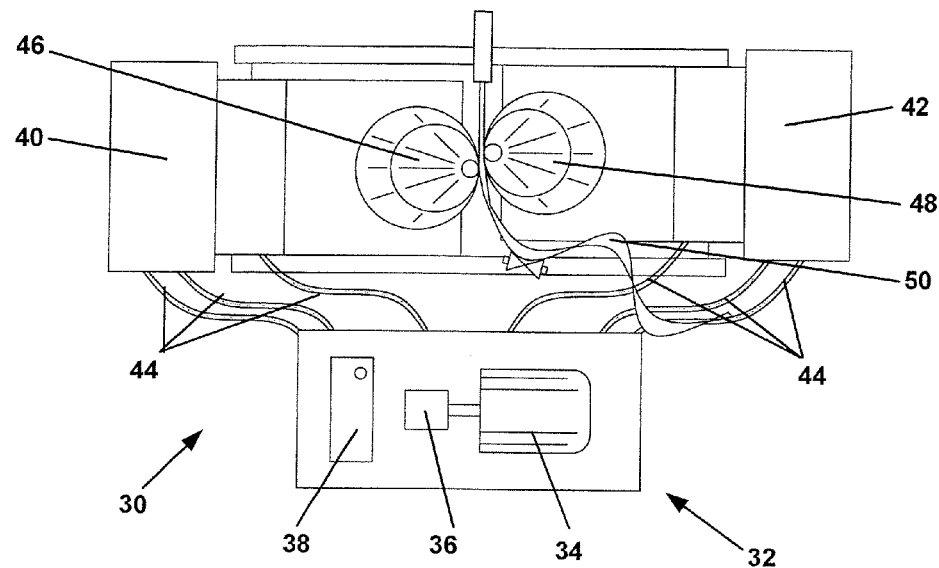
FIG. 5 is a diagrammatic plan view of the machine used to form the flighting shown in FIG. 1.
Figure 6:
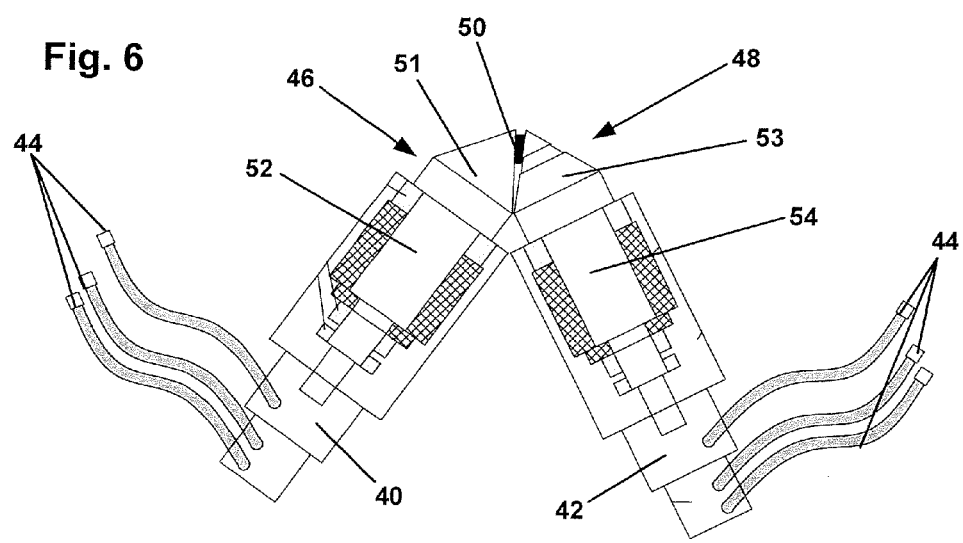
FIG. 6 is a diagram of the roller assemblies of the machine used to form the flighting shown in FIG. 1.

Continuous flighting of the type described above and illustrated in FIGS. 1, 3 and 4 may be produced on a conventional continuous flight rolling machine provided one of the pair of rollers typically used is replaced with a roller designed to produce the flighting profile shown in FIGS. 3 and 4. Other improvements may be made to the continuous flight rolling machine and these are illustrated in FIGS. 5 and 6. Traditional flight rolling machines include a pair of roller housings in which conical flight-forming rollers are mounted for rotation about transversely offset axes and at a mutual inclination such that the conical rolling surfaces contact one another along respective radial lines. Such a flighting machine is shown in U.S. Pat. No. 5,678,440 to Hamilton granted on Oct. 21, 1997, the disclosure of which is incorporated herein by reference. A threaded connection is usually provided to join each roller to a drive shaft. The arrangement shown in FIGS. 5 and 6 represents an improvement in terms of strength and in terms of maintenance because the rollers 46 and 48 have their flight-forming portions (51 and 53, respectively) integrally formed with their drive shafts (52 and 54, respectively).

Also, and as shown in U.S. Pat. No. 5,678,440, prior art flight-rolling machines typically incorporated separate speed reduction gear boxes, couplings, speed change selector boxes, and timing belt transmissions. The two belts were coupled to a clutch driven by an electric motor. As shown in FIGS. 5 and 6, the present invention simplifies the construction of the flight forming machine 30 by providing a power plant 32 incorporating a pump 36 driven by an electric motor 34, a reservoir (not shown) and a control valve assembly 38.

Six hoses are connected to the power plant 32. These include a pressure hose 80, a return hose 82 and a case drain hose 84 used to couple the power plant 32 to a first hydraulic drive assembly 40 comprising a hydraulic motor and reducer. The six hoses also include a pressure hose 86, a return hose 88 and a case drain hose 90 used to couple the power plant 32 to a second hydraulic drive assembly 42 comprising a hydraulic motor and reducer. Those skilled in the art will understand that the essential component of each hydraulic drive assembly is its hydraulic motor. Some hydraulic motors have built-in reducers. In other cases, the control valve assembly 38 can provide sufficient control such that the reducer can be eliminated. Thus, the use of the term "hydraulic drive assembly" is intended to be read broadly enough to cover a hydraulic drive incorporating a hydraulic motor whether or not a separate reducer is also present.

The first hydraulic drive assembly 40 is coupled to the drive shaft 52 of roller 46. The second hydraulic drive assembly 42 is coupled to the drive shaft 54 of roller 48. The control valve assembly 38 controls the flow of hydraulic fluid to the hydraulic motors of the hydraulic drive assemblies 40 and 42 and, thus, the speed at which the rollers 46 and 48 turn. This arrangement offers various advantages over prior art arrangements, not the least of which are the ability to provide a soft start-up, the ability to gradually impart torque and speed to the flight-forming rollers 46 and 48, and a substantial reduction in noise associated with operation of the equipment when forming the flighting.

In addition to the improvements to the drive mechanism of the flight-forming machine 30 described above, changes have also been made to the flight-forming roller 48 which are critical to provide the flighting shape described above and shown in FIGS. 3 and 4.

As noted above, the principal advantages of the present invention are achieved by replacing the rollers shown in U.S. Pat. No. 5,678,440 with rollers designed to form the flighting material 50 into the shape of flighting 14. FIGS. 5 and 6 show how, when the rollers 46 and 48 spin on their respective axes, flighting material 50 is passed between the rollers 46 and 48 to create the flighting 14 of the desired shape. To achieve the desired shape, the flight forming portions 51 and 53 of the rollers are provided with different profiles. The flight forming portion 51 of roller 46 has a cylindrical section and a conic section as best shown in FIG. 6. Roller 46 produces the shape of the rear surface 20 of the flighting 14. Roller 48 produces the shape of the carrying surface 18 of the flighting and has a more complex shape as illustrated in FIG. 7.

FIG. 7 specifically shows roller 48 has a flight-forming portion 53 and an integrally formed drive shaft 54. The flight-forming portion 53 includes a circular cylindrical section 60 joined to the drive shaft 54. Extending upward from the cylindrical section 60 is a first frusto-conical section 64. The frusto-conical section has a base 62, a top surface 66 extending along a plane parallel to the base 62 and an outer wall extending between the base 62 and top surface 66. Extending upwardly from the top surface 66 is a second frusto-conical section 68. The base of the second frusto-conical section 68 has a smaller diameter than the top surface 66 of the first frusto-conical section 64. Also, the top of second frusto-conical section 68 has a smaller diameter than the base 70 of the tip section 72 of the flight-forming portion 53. It is also important to note the tip section 72 is not actually conical. Instead, the outer surface 74 of the tip section 72 is bulged outwardly between the base 70 of the tip section 72 and the termination point 76 at the top of the tip section 72. Given this configuration, the material 50 of the flighting 14 will be formed into the desired shape of the flighting shown in FIGS. 1, 3 and 4 as it is passed between the rollers 46 and 48 as shown in FIGS. 5 and 6.

Those skilled in the art will recognize various changes in the shape of the flighting can be achieved by modifying the profile of rollers 46 and 48. By increasing the amount of bulge in the tip section 72, the changes in diameter between the sections 64, 68 and 72 of the roller or the height of the three sections 64, 68 and 72, the shape of the flighting 14 can be altered as desired. Thus, the shapes shown are not intended to be limiting except as set forth in the claims.

By using a roller such as 48 to form the flight 14, the durability of the radially outward portions of the flighting 14, and particularly the outside peripheral edge 17 and outside section 26, is improved. Also, the shape of the carrying surface 18 of the flighting distributes wear over a larger portion of the surface. This improved wear distribution is achieved by providing a central concave section 24 and the thicker outside section 26. The central concave section 24 tends to move some of the material being carried by the conveyor 10 away from the outside peripheral edge 17 thereby distributing the load and wear over a larger portion of the carrying surface 18 and significantly increasing the useful life of conveyor 10. The other changes to traditional flighting machines described above reduce manufacturing costs and also the time and expense required to maintain flighting equipment. More specifically, the improvements described above result in reduced roller failure and bearing failure because the improved equipment permits a soft start-up and the ability to gradually impart torque and speed to the flight-forming rollers 46 and 48.

What is claimed is:

1. A conveyor comprising an outer casing, a shaft and a fighting coupled to the shaft, the fighting having between its outside peripheral edge and inner edge an outside section, a central concave section and an inside section, wherein said inside section is tapered and the thinnest point of the central concave section is about 50% as thick as the inside section at the inner edge nearer to the outside section than the inside section to provide smooth transitions between adjacent sections and a carrying surface free from ridges and sharply radiused areas.

2. The conveyor of claim 1 wherein the outside section has a radial length of about 10% to about 15% of the distance between the outside peripheral edge and the inner edge, the central concave section has a radial length of about 55% to 60% of the distance between the outside peripheral edge and the inner edge, and the inside section has a radial length of about 25% to 30% of the distance between the outside peripheral edge and the inner edge of the fighting.

3. The conveyor of claim 1 wherein the inside section is thicker than the outside section.

4. The conveyor of claim 1 wherein the thinnest point of the central concave section is between about 40% and 80% as thick as the inside section at the inner edge.

5. The conveyor of claim 1 wherein the outside section is about 130% thicker than the thinnest part of the central concave section.

6. A conveyor comprising an outer casing, a shaft and a fighting coupled to the shaft, the fighting having between its outside peripheral edge and its inner edge an outside section, a central concave section and an inside section, wherein said inside section is tapered and the thinnest point of the central concave section is nearer to the outside section than the inside section to provide smooth transitions between the adjacent sections and a carrying surface free from ridges and sharply radiused areas, and wherein the carrying surface of the fighting is formed using a cold roll forming process and a roller having a cylindrical section joined to a drive shaft, a first frusto-conical section extending from the cylindrical section, a second frusto-conical section extending from the first frusto-conical section, and a tip section extending from the second frusto-conical section, the base of the second frusto-conical section being smaller in diameter than the top of the first frusto-conical section, the top of the second frusto-conical section being smaller in diameter than the base of the tip section, and the tip section having an outer surface which is bulged outwardly between the base of the tip section and the termination point at the top of the tip section.

7. The conveyor of claim 6 wherein the carrying surface is formed using a roller which is integrally formed.

8. The conveyor of claim 6 wherein the carrying surface is formed using a roller turned by a hydraulic drive assembly coupled by hoses to a power plant comprising a motor, pump and valve assembly.

9. An apparatus for forming fighting for a conveyor comprising a roller having a cylindrical section coupled to a drive shaft, a first frusto-conical section extending from the cylindrical section, a second frusto-conical section extending from the top of the first frusto-conical section, and a tip section extending from the top of the second frusto-conical section; wherein the base of the second frusto-conical section has a smaller diameter than the top of the first frusto-conical section, the top of the second frusto-conical section has a diameter smaller than the diameter of the base of the tip section, and the tip section has an outer surface which bulges outwardly between the base of the tip section and the terminal point of the tip section such that fighting produced using the apparatus has a carrying surface free from ridges and sharply radiused areas.

10. The apparatus of claim 9 further comprising a hydraulic drive assembly for rotating the roller, the hydraulic drive assembly being coupled by hoses to a power plant comprising a motor, a pump and a control valve assembly.

* * * * *

UNITED STATES PATENT AND TRADEMARK OFFICE
CERTIFICATE OF CORRECTION

| | | |
|---|---|---|
| PATENT NO. | : 8,069,973 B2 | Page 1 of 1 |
| APPLICATION NO. | : 12/773221 | |
| DATED | : December 6, 2011 | |
| INVENTOR(S) | : Robert Wynnobel and Andrew Wilton | |

It is certified that error appears in the above-identified patent and that said Letters Patent is hereby corrected as shown below:

Claim 1, col. 6, line 25 the word "fighting" should be "flighting" in both instances.

Claim 2, col. 6, line 41 the word "fighting" should be "flighting".

Claim 6, col. 6, line 51 the word "fighting" should be "flighting" in both instances; line 58 the word "fighting" should be "flighting".

Claim 9, col. 7, line 10 the word "fighting" should be "flighting".

Signed and Sealed this
Thirty-first Day of January, 2012

David J. Kappos
*Director of the United States Patent and Trademark Office*